(12) United States Patent
Kleinhenz et al.

(10) Patent No.: US 8,824,973 B2
(45) Date of Patent: Sep. 2, 2014

(54) FILTERING OF A MEASUREMENT QUANTITY IN A MOBILE COMMUNICATION NETWORK

(75) Inventors: Thomas Kleinhenz, Nürnberg (DE); Rainer Bachl, Nürnberg (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 177 days.

(21) Appl. No.: 13/513,710

(22) PCT Filed: Dec. 10, 2009

(86) PCT No.: PCT/EP2009/066854
§ 371 (c)(1),
(2), (4) Date: Jun. 28, 2012

(87) PCT Pub. No.: WO2011/069550
PCT Pub. Date: Jun. 16, 2011

(65) Prior Publication Data
US 2012/0264476 A1    Oct. 18, 2012

(51) Int. Cl.
*H04B 17/00* (2006.01)
(52) U.S. Cl.
USPC .............. 455/67.13; 455/67.11; 455/277.2
(58) Field of Classification Search
USPC ............ 455/67.11, 436, 67.13, 135, 115.1, 455/226.1, 226.2, 226.3, 277.2
See application file for complete search history.

(56) References Cited

U.S. PATENT DOCUMENTS

| | | | |
|---|---|---|---|
| 7,363,057 B2* | 4/2008 | Ishii et al. | 455/562.1 |
| 7,383,022 B2* | 6/2008 | Sebire et al. | 455/67.11 |
| 7,526,257 B2* | 4/2009 | Ogura | 455/78 |
| 2004/0102167 A1 | 5/2004 | Shim et al. | |
| 2004/0229659 A1 | 11/2004 | Boos et al. | |
| 2005/0239410 A1* | 10/2005 | Rochester, III | 455/67.11 |
| 2006/0068731 A1 | 3/2006 | Seier | |
| 2008/0082180 A1 | 4/2008 | Blevins et al. | |
| 2009/0274204 A1 | 11/2009 | Chen et al. | |
| 2009/0285109 A1 | 11/2009 | Chin et al. | |
| 2010/0135172 A1* | 6/2010 | Cui et al. | 370/252 |
| 2012/0115463 A1* | 5/2012 | Weng et al. | 455/425 |

FOREIGN PATENT DOCUMENTS

| | | |
|---|---|---|
| EP | 2686816 A1 | 8/2006 |
| EP | 2117141 A1 | 11/2009 |

* cited by examiner

*Primary Examiner* — Sonny Trinh
(74) *Attorney, Agent, or Firm* — Coats & Bennett, PLLC

(57) ABSTRACT

A method for filtering measurement values of a measurement quantity obtained from a communication between a mobile device and a mobile communication network and a mobile communication network device adapted to filter such measurement values are provided. A measurement value for the measurement quantity is to be periodically received at fixed points in time. The measurement value is filtered using a digital filter for obtaining a filtering result, wherein the filtering of the measurement value includes the weighting of the measurement value with a weighting coefficient. The filtering result can be provided for an adaptation of the communication link to the mobile device.

20 Claims, 9 Drawing Sheets

US 8,824,973 B2

FILTERING OF A MEASUREMENT QUANTITY IN A MOBILE COMMUNICATION NETWORK

TECHNICAL FIELD

The present invention relates to a method for filtering measurement values of a measurement quantity obtained from a communication between a mobile device and a mobile communication network, and to a mobile communication network device adapted to filter such measurement values.

BACKGROUND

To achieve mobility in a wireless cellular communication system, continuous service has to be offered even if a user equipment (UE), such as a mobile phone, moves between cells of the mobile communication network. The continuous service is achieved by a handover (or handoff), which is generally initiated either by crossing a cell boundary or by a deterioration in the quality of the signal in the current channel. During the handoff, the link between the user equipment and the mobile communication network needs to be adapted, e.g. by terminating a link to the base station (BS) of the cell which is left and setting up a new link with the base station of the cell which the UE enters. Other than during handoff, link adaptation is generally used in the wireless communication to match the modulation, coding and other signal and protocol parameters to the conditions on the radio link. The adaptation can be performed dynamically so that the signal and protocol parameters change as the radio link conditions change. As an example, the modulation and coding scheme may be adapted to the quality of the radio channel by means of a rate adaptation algorithm to ensure robustness of the data transmission.

To perform an efficient adaptation, some information on the transmission channel is required at the transmitter. To obtain such information, the UE for example measures the signal strength or quality of the neighbour cells during cell selection or reselection and handover. Depending on the type of mobile communication network, the UE or the base station measure different operating parameters. Base station here generally means the node of the wireless communication network communicating with the UE. In a universal mobile telecommunications system (UMTS) network, the UE may for example measure the received signal strength indicator (RSSI), while in a long term evolution (LTE) network, the UE may measure the reference signal received power (RSRP) and the reference signal received quality (RSRQ). The UE can measure such measurement quantities by performing physical layer measurements that are processed by the UE and then conveyed to the base station.

An implementation of such measurements is for example given in the 3GPP reference TS 36.331 V8.6.0, which specifies the radio resource control protocol for the E-UTRAN (evolved UMTS terrestrial radio access network) radio interface. The measurement processing in the UE comprises two stages, namely the physical layer filtering in the linear domain and a higher layer filtering in the logarithmic domain. The physical layer filtering can simply be the averaging of several measurement snapshots. The higher layer filtering is then used for post processing the results from the physical layer filtering. Section 5.5.3.2 of the document mentioned above describes a higher layer filtering using a one tap infinite impulse response (IIR) filter. The latest received measurement result from the physical layer (after physical layer filtering) is filtered by using a fixed filter coefficient which is preset in accordance with the sampling rate. A certain time characteristics of the filter is thus obtained. The higher layer filtered measurement result can then be used for link adaptation.

The problem now raises that in certain situations, physical layer measurements are not available for the higher layer filtering operation. Situations in which physical layer measurements may not be available include the continuous receiving of data by the UE, as a result of which the UE cannot perform the physical layer measurements at the same time; the UE being operated in an idle period; the UE being in a period with discontinuous reception (DRX); and the UE having a measurement gap for measurements from a cell that is different from the cell considered. When such physical layer measurement gaps are present, the results of the higher layer filtering can be misleading and do not correctly reflect the physical layer general conditions for the UE. In particular, the reported values are supposed to provide up to date information about the physical layer channel conditions, but the tracking behaviour of the measurement reports with respect to the time varying channel conditions is deteriorated in case of missing physical layer measurements. Furthermore, the filtering is not transparent for the base station, as it does not have any information about physical layer measurement gaps of the UE, so that it is difficult for the base station to interpret the higher layer filtered measurement results. This may result in an incorrect link adaptation, and consequently in a degradation of the quality of communication between the UE and the base station.

It is thus desirable that the filtering results obtained after higher layer filtering more closely reflect the actual channel conditions. In particular, it is desirable to reduce the influence of measurement gaps on the higher layer filtered measurement result, and to enable a meaningful interpretation of these results.

It is thus an object of the present invention to obviate at least some of the above disadvantages and to provide an improved filtering of measurement values of a measurement quantity.

SUMMARY

According to an aspect of the invention, a method for filtering measurement values of a measurement quantity obtained from a communication between a mobile device and a mobile communication network is provided. A measurement value for the measurement quantity is to be periodically received at fixed points in time. The measurement value is filtered using a digital filter for obtaining a filtering result for the measurement quantity, wherein the filtering of the measurement value includes the weighting of the measurement value with an adaptive weighting coefficient. The method comprises receiving a current measurement value at a current point in time. If no measurement value was received for the previous point in time preceding the current point in time, the adaptive weighting coefficient for weighting the current measurement value is adjusted in dependence on the time interval ($\Delta t$) between the receiving of the current measurement value and a receiving of the last measurement value preceding the current measurement value. The adaptive weighting coefficient is then used for filtering the current measurement value to obtain the filtering result for the measurement quantity.

The adaptive filtering coefficient can thus be adapted if a measurement gap occurs, for example when the measurement values for the measurement quantity are obtained with a constant sampling rate and some samples are missing. The filtered measurement value or filtering result can be used for adjusting an operating parameter of the communication between the mobile device and the mobile communication network. By performing such a filtering for the measurement quantity, its variation in time can for example be smoothed, so that a frequent or erratic adaptation of the operating parameter can be prevented. As the filtering is performed with the adaptive filtering coefficient, which depends on the time interval to the previously received measurement value, the filtered measurement value can better reflect the actual condition of the communication between the mobile device and the mobile communication network, it may for example better reflect the physical layer channel conditions.

According to an embodiment, the weighting coefficient is adjusted by setting the weighting coefficient to a value determined as a function of the time interval, the value increasing for an increasing time interval. As the current measurement value is weighted with the adaptive weighting coefficient, the current measurement value is thus given a higher weight for an increasing time interval. The function may be configured such that the filtering result approaches the current measurement value for an increasing time interval. This is beneficial as for very large measurement gaps, the previously received measurement value does no longer reflect the actual communication conditions, which are better reflected by the current measurement value.

The weighting coefficient may be adjusted by setting the weighting coefficient to a first value (a) if said time interval ($\Delta t$) is smaller than a predetermined threshold time interval and by setting the weighting coefficient to a second value larger than the first value if the time interval ($\Delta t$) exceeds the predetermined threshold time interval. As an example, the first value may be a regular filtering coefficient (a) which is used when no measurement gaps are present, while the second value may be equal to one, so that only the current measurement value is considered. With the predetermined threshold time interval, it is thus possible to determine at what measurement gap size preceding measurement values are no longer taken into account in the filtering.

It is also possible that said function starts at a first value and gradually increases with an increasing time interval to a second value larger than the first value. The function may be a ramp which starts at the time interval equaling the sampling period (T) by which the predetermined points in time are spaced, and which ends at a threshold time interval. The weighting coefficient can thus be ramped up to a value of one (at which $\Delta t$ exceeds T), so that the influence of preceding measurements can gradually be decreased for an increasing measurement gap.

Further, it is possible to adjust the adaptive weighting coefficient (a') by setting the adaptive weighting coefficient (a') to a value determined as a function of the time interval ($\Delta t$). The function can comprise an autocorrelation function ($\rho$) estimated for the measurement quantity in dependence on the time interval, wherein the function can be configured such that the value increases with a decreasing autocorrelation of the measurement quantity for the time interval. Accordingly, if the time interval becomes so large that the autocorrelation of the measurement quantity decreases, the weighting coefficient is increased so that the current measurement value is considered with higher weight. Accordingly, if a sufficient autocorrelation is still present for larger measurement gaps, preceding measurement value can still be considered, so that the filtering of the current measurement value is improved, and the filtering function can be maintained.

The filtering may be performed by determining a weighted average of at least the current measurement value weighted by the adaptive weighting coefficient (a') and a previous filtering result weighted by a second weighting coefficient. The second weighting coefficient may be (1-a'). The filtering may thus be performed by an infinite impulse response (IIR) filtering operation using the adaptive weighting coefficient.

The measurement quantity may be selected from a group comprising a reference signal received power (RSRP), a received signal strength indicator (RSSI), a reference signal received quality (RSRQ), a carrier to interference-plus-noise ratio (CINR), a signal to interference-plus-noise ratio (SINR), and a received signal code power (RSCP).

The current measurement value may be obtained by performing a number of measurements for the measurement quantity and determining the current measurement value by filtering the number of measurements. The measurements (or measurement snapshots) may be physical layer measurements and may be filtered (physical layer filtering) by averaging a predetermined number of measurement snapshots, by a minimum mean square error (MMSE) filtering of a predetermined number of measurement snapshots, or by any other filtering method. Further, the logarithm may be taken of the physical layer filtering result to provide the current measurement value.

The adjustment of the adaptive weighting coefficient can be performed dynamically during the operation of the mobile device.

The method may be automatically performed by the mobile device or by a base station of the mobile communication network in communication with the mobile device. The term "base station" as used herein is not limited to a particular type of mobile communication network, but is meant to refer to any network node of the mobile communication network providing connectivity to the mobile device, such as a Node B, an e-Node B, a base transceiver station (BTS), and the like.

The method may be performed by the mobile device and may further comprise the step of transmitting the filtering result to a base station of the mobile communication network. Thus, a link adaptation performed by the base station in accordance with the filtering result for the measurement quantity may be enabled. In particular, the link to the mobile device may be adapted, and a handover to another base station may be enabled. The measurement quantity may be indicative of a quality of a communication link between the mobile device and the base station of the mobile communication network. It may be transmitted to the base station with which the link is established, or it may also be transmitted to another base station which communicates with the mobile device.

According to another embodiment, the method can be performed by a base station of the mobile communication network and further comprises the step of receiving information from the mobile device relating to the points in time at which the mobile device was or was not capable of obtaining a measurement value for the measurement quantity. The base station can thus obtain information about the measurement gaps, and can perform the filtering of the current measurement value correspondingly, so as to obtain a meaningful result on the basis of which an improved link adaptation can be performed. It is of course also possible to directly perform measurements for obtaining measurements values for the measurement quantity at the base station, e.g. based on a signal received from the mobile device. The measurement quantity can be measured by the base station, yet measurement values may also be received from the mobile device, e.g. by a corresponding data message.

According to another aspect of the present invention, a mobile communication network device adapted to filter measurement values of a measurement quantity obtained from a communication between the mobile communication network device and a second mobile communication network device is provided. The mobile communication network device comprises a digital filter adapted to periodically receive a measurement value for the measurement quantity at fixed points in time and filter the measurement value for obtaining a filtering result, the filtering of the measurement value including the weighting of the measurement value with an adaptive weighting coefficient. The mobile communication network device further comprises a filter adjustment unit adapted to adjust the adaptive weighting coefficient for weighting a current measurement value received by the digital filter at a current point in time in dependence on the time interval between the receiving of the current measurement value and a receiving of the last measurement value preceding the current measurement value if no measurement value was received for the previous point in time preceding the current point in time.

With such a mobile communication network device, advantages similar to the ones outlined above can be achieved.

According to an embodiment, the filter adjustment unit can be adapted to adjust the weighting coefficient by setting the weighting coefficient to a value determined as a function of the time interval, the value increasing for an increasing time interval.

The mobile communication network device may further comprise an autocorrelation determination unit adapted to estimate an autocorrelation function for the measurement quantity in dependence on the time interval, wherein the filter adjustment unit is adapted to adjust the weighting coefficient by setting the weighting coefficient to a value determined as a function of the autocorrelation function, the function being configured such that the value increases with a decreasing autocorrelation of the measurement quantity for said time interval.

The mobile communication network device may further comprise a memory adapted to store at least one filtering result, wherein the digital filter may be adapted to perform the filtering by determining a weighted average of at least the current measurement value weighted by the adaptive weighting coefficient (a') and the previous filtering result retrieved from the memory and weighted by a second weighting coefficient. Again, the second weighting coefficient may for example be (1-a').

The mobile communication network device may further comprise a measurement unit adapted to perform a number of measurements for the measurement quantity and a filtering unit adapted to filter the number of measurements for providing the current measurement value. The measurements can be physical layer measurements.

The filter unit may for example perform an averaging of the physical layer measurements, or may apply another filtering method as mentioned further above.

According to an embodiment, the mobile communication network device may be a mobile device and the second mobile communication network device may be a base station of a mobile communication network. According to another embodiment, the mobile communication network device may be a base station of a mobile communication network, and the second mobile communication network device may be a mobile device. A mobile device may for example be a mobile phone, a personal digital assistant, a wireless handheld device, a laptop computer, a modem box, a surf stick, or any other type of handheld or vehicle mounted communication device.

The mobile communication network device may further be adapted to perform any of the methods mentioned above.

It should be clear that the features of the aspects and embodiments of the present invention mentioned above and explained further below can be used not only in the respective combinations indicated, but also in other combinations or in isolation, without leaving the scope of the present invention.

BRIEF DESCRIPTION OF THE DRAWINGS

The foregoing and other features and advantages of the invention will become further apparent from the following detailed description read in conjunction with the accompanying drawings. In the drawings, like reference numerals refer to like elements.

Figure 1:
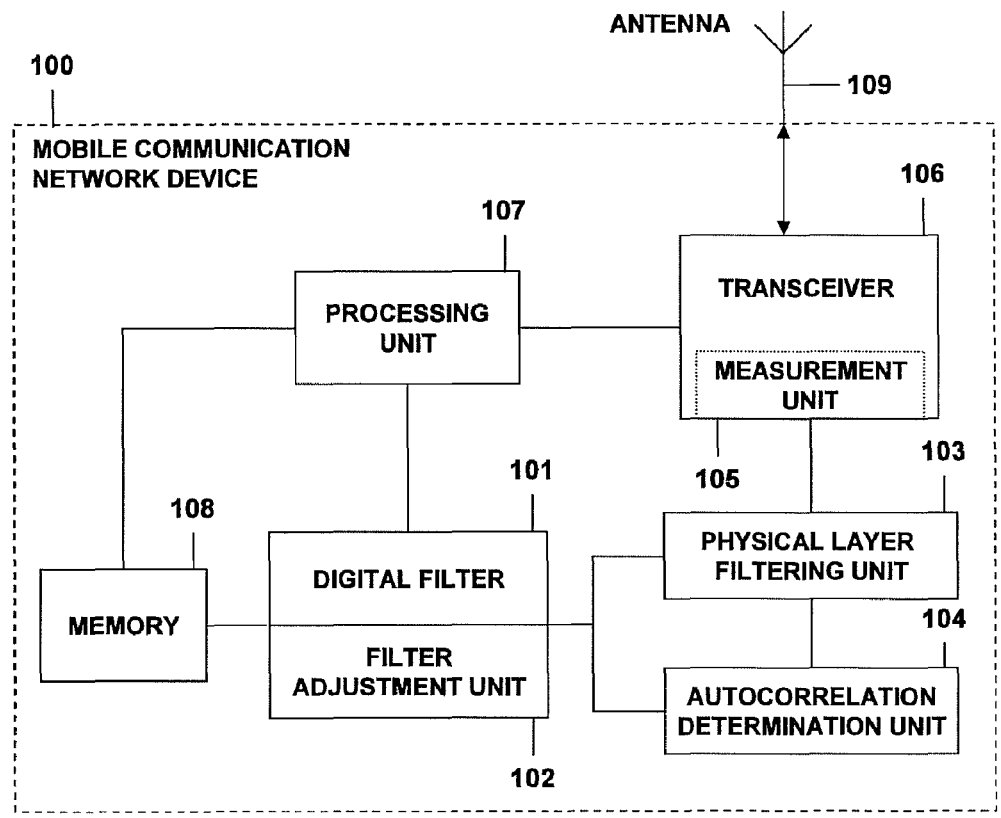
FIG. 1 is a schematic functional block diagram of a mobile communication network device according to an embodiment of the invention.

In the following, embodiments of the present invention will be described in detail with reference to the accompanying drawings. It is to be understood that the following description of embodiments is given only for the purpose of illustration and is not to be taken in a limiting sense. The scope of the invention is not intended to be limited neither by the embodiments described hereinafter nor by the drawings, which are taken to be illustrative only, but is intended to be limited only by the appended claims and equivalents thereof. The drawings are to be regarded as being schematic representations only, and elements in the drawings are not necessarily to scale with each other. Any direct connection or coupling between functional blocks shown in the drawings or other physical or functional units, i.e. any connection or coupling without intervening elements, could also be implemented by an indirect connection or coupling, i.e. a connection or coupling with one or more additional intervening elements. The physical or functional blocks or units are not necessarily implemented as physically separate units, but the blocks or units shown or described may be implemented as separate units, circuits, chips or circuit elements, or may as well be implemented in a common circuit, chip, circuit element or unit.

FIG. 1 shows a functional, schematic block diagram of a mobile communication network device too according to an embodiment of the present invention. The device too can for example be implemented as a mobile device, such as a user equipment (UE), e.g. a mobile phone or personal digital assistant, or it can be implemented as a base station of the mobile communication network. Device 100 performs the filtering of a measurement quantity, i.e. it filters the measurement values received for a particular parameter that is to be measured. The measurement quantity relates to the signal strength and/or quality of a link via which the device 100 communicates with another device of the mobile communication network, in particular a link between a mobile device and a base station. Device too comprises antenna 109 and transceiver 106 to communicate with the mobile communication network. The communication is generally achieved by transmitting voice data or other data over a communication channel, which can be determined by its frequency, timeslot, spreading code or a combination of them. As the mobile device moves, the conditions on the radio link between the mobile device and the base station change, in particular if the mobile device moves between cells. Conditions that may change include the path loss, the interference due to signals coming from other transmitters, the sensitivity of the receiver, the available transmitter power margin and the like. For performing a link adaptation, which may also be termed adaptive modulation and coding (AMC), the device too performs a measurement of the signal strength/quality in the current channel.

For this purpose, measurement unit 105 is provided as part of transceiver 106. It performs physical layer measurements of a measurement quantity (or parameter) indicative of the quality of communication over the link. For example, it measures the reference signal received power (RSRP) or the reference signal received quality (RSRQ) in an LTE-network, or the received signal strength indication (RSSI) or the common pilot channel (CPICH) received signal code power (RSCP) in an UMTS network. Other parameters may be measured in other networks, such as the CINR or SINR in a WiMax network. These parameters can be measured both on the downlink as well as on the uplink (i.e. by the UE or by the base station, respectively), yet they are generally measured by the UE on the downlink.

Within a measurement period T, measurement unit 105 performs a predetermined number of physical layer measurements (measurement snapshots). In an UE, the measurement may for example be performed in an intermediate frequency stage or in the baseband signal chain, and a measured analog level may be converted by ADC (analog to digital conversion) into a corresponding digital measured value. These values are passed to physical layer filtering unit 103.

The filtering unit 103 filters the measurement snapshots for example by averaging the physical layer measurements obtained in the measurement period T, or by another filtering method, such as the minimum mean square error (MMSE) filtering or the like. Thus, a current measurement value (which, as a result of the physical layer filtering, may also be termed measurement result) is obtained at specified points in time separated by T, and supplied to the digital filter 101. Digital filter 101 implements an one tap infinite impulse response (IIR) filter for filtering the measurement values obtained from filtering unit 103. Accordingly, two filtering stages are implemented in device 100, with filtering unit 103 performing a physical layer filtering in the linear domain and digital filter 101 performing a higher layer filtering in the logarithmic domain. For performing an IIR filtering, a previous high layer filtered measurement value (or filtering result) is stored in memory 108, and digital filter 101 determines a weighted average of the current measurement value and the stored previous filtering result. According to the embodiment, the digital filter 101 uses an adaptive weighting coefficient a' for weighting the current measurement value, while the previous filtering result is weighted with (1-a').

To ensure a correct interpretation of the filtering result even in time varying channel conditions which may produce measurement gaps, a filter adjustment unit 102 is provided which adjusts the adaptive filter coefficient a'. The adjustment is performed in dependence on a time interval between the obtaining of the current measurement value and the obtaining of the preceding measurement value. If the time interval (Δt) equals the measurement period T, a regular weighting coefficient a is used, while for increasing time intervals (i.e. increasing measurement gaps), the weighting of the current measurement value is increased. Thereby, the influence of the preceding measurement values, which may no longer reflect the actual conditions of the radio channel, is substantially reduced. For the adjustment of the weighting coefficient, a simple function, such as step function or a ramp may be used, yet it may also be based on a more complex autocorrelation function.

For this purpose, autocorrelation determination unit 104 is optionally provided, which determines the autocorrelation of the measurement values received over time for the measurement quantity. The autocorrelation of the measurement quantity can be determined for different time shifts. A high autocorrelation for a certain time interval Δt>T indicates that even though a measurement gap exists, the preceding received measurement values may still reflect the channel conditions, while a low autocorrelation indicates that the preceding measurement values are no longer representative. The weighting coefficient can thus be adjusted accordingly to obtain a meaningful filtering result.

The higher layer filtered measurement value is then supplied to the processing unit 107. Processing unit 107 may use the filtering result for performing a link adaptation, or may generate a message including the filtering result and may transmit the message via transceiver 106 to another device being part of the mobile communication network, such as a base station.

It should be clear that device 100 may comprise further units, such as units that are common for a user equipment or a base station. Also, the units shown in FIG. 1 can be implemented in one or more physical units, yet they may also be implemented as software running on a processor of the device 100. As an example, measurement unit 105 may be implemented as a physical unit and may comprise an analog to digital conversion (ADC), while units 101 to 104 may be implemented as software comprising instructions for processing the digital values delivered by measurement unit 105.

Figure 2:
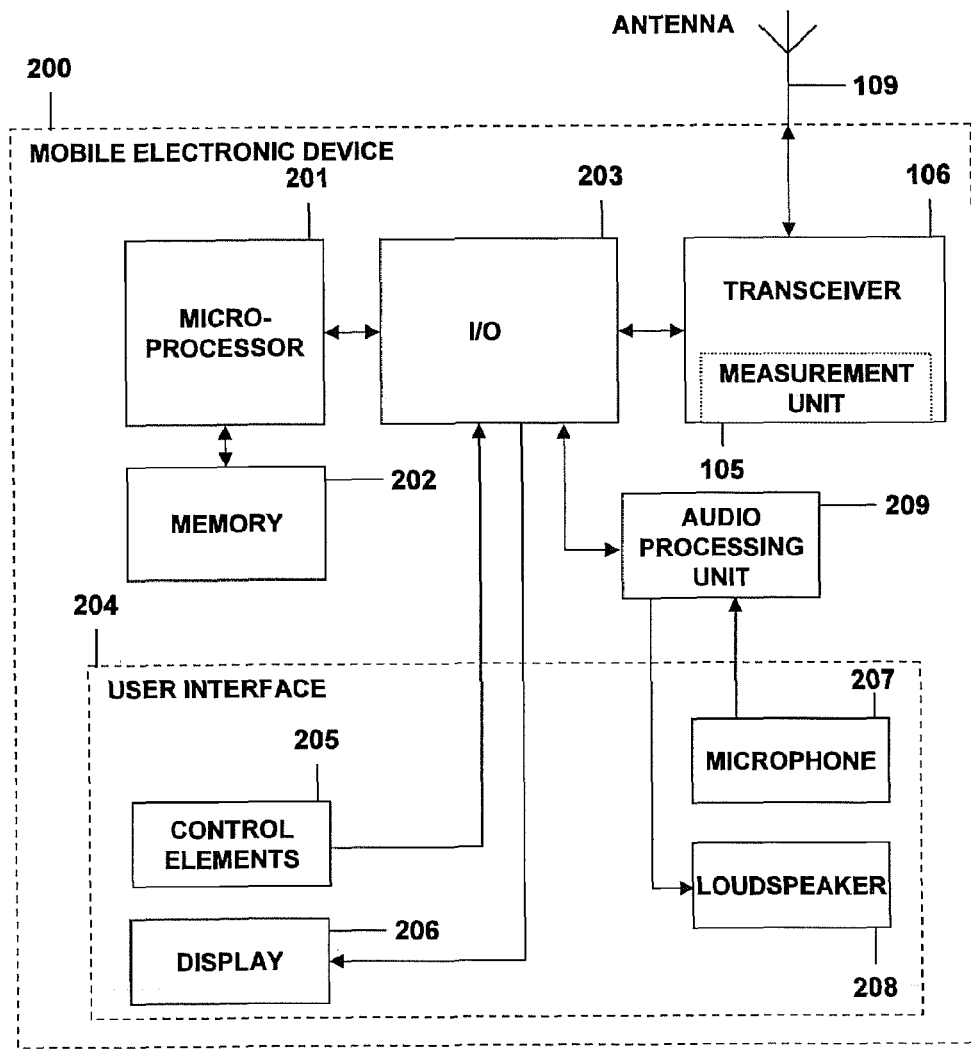
FIG. 2 is a schematic block diagram of a mobile communication network device in form of a mobile electronic device according to an embodiment of the invention.

As an example, FIG. 2 shows an implementation of device 100 in form of a mobile electronic device 200, in particular as a UE, such as a mobile phone, a personal digital assistant or the like. Mobile device 200 can communicate with a base station of a mobile communication network via antenna 109 and transceiver 106. Measurement unit 105 delivers physical layer measurements of the measurement quantity, e.g. a measured RSRP or RSSI, via input/output unit 203 to microprocessor 201. Microprocessor 201 controls the operation of the device 200 according to programs stored in memory 202. Microprocessor 201 may be implemented as a single microprocessor or as multiple microprocessors, in the form of a general purpose or a special purpose microprocessor, or of one or more digital signal processors. Memory 202 may comprise all forms of memory, such as random access memory (RAM), read only memory (ROM), non volatile memory such as EPROM or EEPROM, flash memory or a hard drive. Memory 202 can store measurement values received for the measured quantity as well as the physical layer filtering results or the filtering results of the higher layer filtering.

Accordingly, microprocessor 201 may perform the physical layer filtering by e.g. averaging over a certain number of physical layer measurements received from measurement unit 105 within a measurement period T, and the resulting current measurement value (or measurement result) is stored in memory 202. Microprocessor 201 can further implement the function of the autocorrelation determination unit 104 to determine an autocorrelation function for predetermined time intervals from the stored measurement values for the measurement quantity. Further, it can implement digital filter 101 to perform the higher layer filtering on a currently received measurement value, by retrieving a previously determined higher layer filtering result from memory 202 and determining a weighted average. Further, microprocessor 201 may also implement filter adjustment unit 102. It may accordingly determine the time interval to the previously received measurement value and thus determine whether measurements were skipped, i.e. a measurement gap exists. In response to detecting a measurement gap, microprocessor 201 adjusts the weighting coefficient for performing the higher layer filtering as described in detail further below. After filtering, microprocessor 201 stores the current filtered measurement value in memory 202 and can compile a message to be sent to the base station via transceiver 106 and antenna 109.

Other implementations are certainly possible, such as implementing the digital filter 101 and the physical layer filtering unit 103 as separate digital signal processors (DSPs), application specific integrated circuits (ASICs), field programmable gate arrays (FPGAs), or the like.

Mobile electronic device 200 can comprise further components, such as a user interface 204 including control elements 205 for enabling a user input, a display 206 for displaying information to a user, as well as microphone 207 and loudspeaker 208 to enable a voice communication or an audio playback. For ADC, the audio signals may be processed by a separate audio processing unit 209. It should be clear that mobile electronic device 200 may comprise further components that are commonly provided in conventional mobile electronic devices, such as a touchscreen, a keypad, a GPS-receiver, a camera, and the like. Mobile electronic device 200 may connect to a plurality of wireless communication networks, such as a GSM (global system for mobile communications) or UMTS network, CDMA One, CDMA2000, or wideband CDMA network, a WiMax network, or an LTE network.

Figure 3:
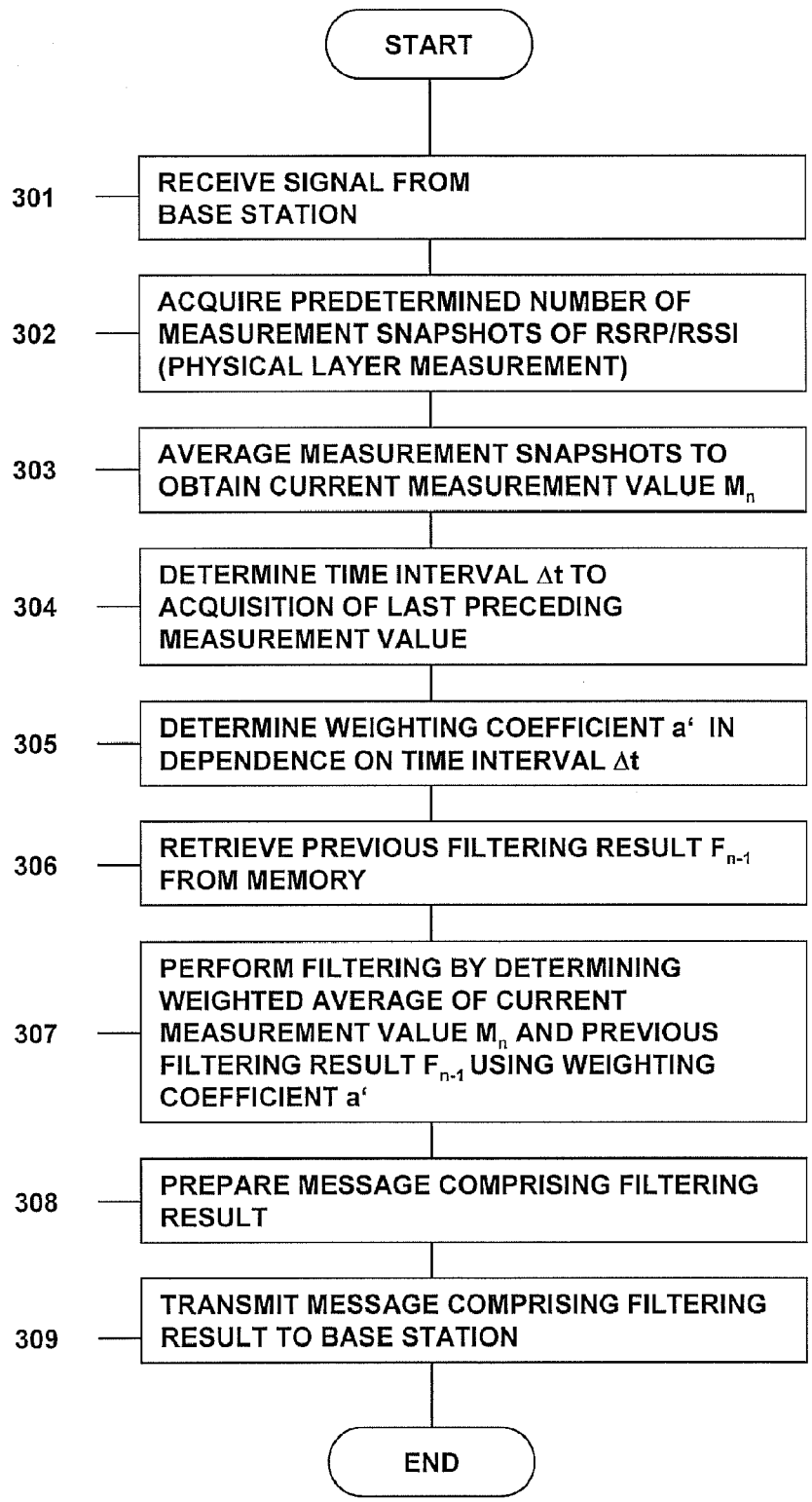
FIG. 3 is a flow diagram illustrating a method according to an embodiment of the invention.

FIG. 3 is a flow-diagram of a method for filtering measurement values of a measurement quantity according to an embodiment of the present invention, which may be performed on the device 100 of FIG. 1 or on the device 200 of FIG. 2. In step 301, a signal from the base station is received at the mobile device. A signal may be received on a particular physical communication channel over a radio link set up to the base station. In step 302, physical layer measurements are performed by acquiring a predetermined number of measurement snapshots of a measurement quantity, such as the RSRP, RSSI or RSCP. For example in UMTS, the signal may be received on the common pilot channel (CPICH) which allows phase and power estimations to be made. The power on the channel denoted by the RSCP can be measured by measurement unit 105 of transceiver 106. The RSCP is an indication of signal strength, and can be used as a handover criterion in downlink power control and to calculate path loss.

The measurement snapshots are obtained over a measurement period T and are averaged to obtain a current measurement value $M_n$ in step 303. As mentioned above, other types of physical layer filtering, such as a minimum mean square error filtering of the measurement snapshots is also possible.

A higher layer filtering is then used for post processing the results from physical layer filtering. The higher layer filtering corresponds to a one tap infinite impulse response filtering operation, which can be described as $$F_n = (1-a) \cdot F_{n-1} + a \cdot M_n \tag{1}$$

wherein $F_n$ is the updated, current higher layer filtered measurement value (filtering result), $F_{n-1}$ is the previous higher layer filtered measurement value, and $M_n$ is the current measurement value received from the physical layer filtering. In a conventional system, the weighting coefficient a depends on the filter coefficient k:

$$a = 1/2^{(k/4)} \tag{2}$$

wherein k is configured by the base station as part of the radio resource control. If k is set to zero, no higher filtering is applicable. At the start of the measurements, $F_0$ is set to $M_1$ when the first measurement value is received from the physical layer filtering, so that the initial value for the higher layer filtering result is given by $F_1 = M_1$. The filtering can be applied in the logarithmic domain, and accordingly, the units for $F_n$ and $M_n$ can be given in decibels (dB) or dBm. For reporting, reference signal received power (RSRP) measurements in an LTE-network can be classified according to the following table:

| Value of RSRP reported to the base station | Value $F_n$, in unit dBm |
| --- | --- |
| 00 | RSRP < −140 |
| 01 | −140 ≤ RSRP < −139 |
| 02 | −139 ≤ RSRP < −138 |
| ... | ... |
| 95 | −46 ≤ RSRP < −45 |
| 96 | −45 ≤ RSRP < −44 |
| 97 | −44 ≤ RSRP |

The converted value corresponding to the $F_n$ obtained after higher layer filtering with a certain quantization and offset is reported to the base station. The unit of the value reported to the base station corresponds to the unit used for $M_n$. The higher layer filtering has two well-defined modes of operation, i.e. (i) the initialisation of the higher layer filtering (as described above) and (ii) the continuous processing of physical layer measurements.

When several physical layer measurements are missing for the higher filtering operation, the present embodiment introduces a third mode of operation, wherein the filtering is performed by making use of an adaptive weighting coefficient which is dynamically adjusted depending on the measurement gap. The adaptive weighting coefficient a' can further consider the correlation between subsequent physical layer measurement results.

Figure 7:
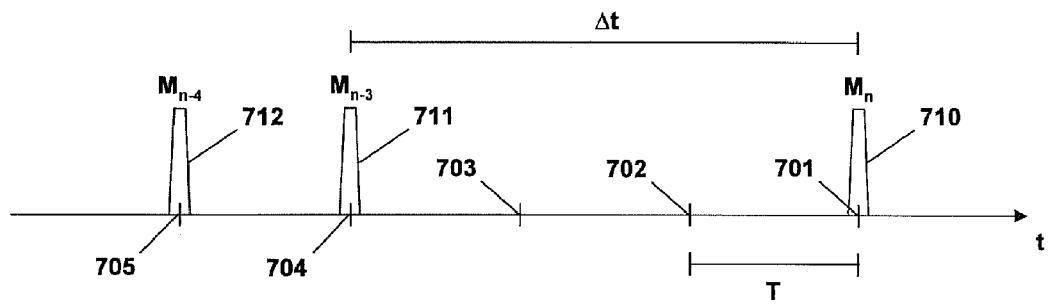
FIG. 7 is a schematic diagram illustrating the receiving of measurement values for a measurement quantity and a measurement gap.

For checking whether a measurement gap exists and for determining the value to be used for the adaptive weighting coefficient, the time interval Δt to the acquisition of the last preceding measurement value is determined in step 304. As depicted in FIG. 7, no measurement gap exists if Δt=T. In FIG. 7, reference numerals 701-705 mark fixed points in time at which measurement values for the measurement quantity M are to be received from the physical layer filtering unit. In the example of FIG. 7, the current measurement value $M_n$ (710) is received at point 701, while at the previous points in time 702 and 703 preceding 701, no measurement values were received, i.e. a measurement gap exists. The conventional higher layer filtering will form a weighted average of the current measurement value 710 and the last higher layer filtering result for the previously received measurement value 711 with the constant weighting coefficient (a) according to equation 1. According to the present embodiment of the invention, the filtering is instead performed by the adaptive weighting coefficient a' determined in dependence on Δt, i.e. the number of missing measurement quantities. The inventive method is thus better suited to account for changes in channel conditions during the time interval Δt.

Returning back to FIG. 3, the adaptive weighting coefficient a' is determined in dependence on the time interval Δt in step 305. For performing the IIR filtering operation, the filtering result $F_{n-1}$ for the previously filtered measurement value is retrieved from memory in step 306. In step 307, the higher layer filtering is performed by determining a weighted average of the current measurement value $M_n$ and the previous filtering result $F_{n-1}$ according to equation (1), using the adaptive weighting coefficient a' instead of a. The current result of the filtering operation can then directly be used or it can be converted according to table 1. A message comprising the filtered measurement value, i.e. the current higher layer filtering result, is prepared in step 308 and is transmitted in step 309 to the base station.

When performing the higher layer filtering as described above, the filtering process is transparent for the base station, which can thus correctly interpret the received filtered quantity and perform a corresponding link adaptation. Due to the use of the adaptive weighting coefficient, the transmitted quantity much better reflects current channel conditions, resulting in an improved link adaptation.

In the following, the determination of the adaptive weighting coefficient a' (step 305) will be described in more detail with reference to the examples illustrated in FIGS. 4, 5, and 6. The filtering of the current measurement value with an adaptive weighting coefficient can be described as a weighted linear combination of the filtering results for initialization and continuous processing. With reference to equation (1) above, the higher layer filtering according to the present embodiments in the presence of measurement gaps can be described as $$F_n = (1-\gamma)\{(1-a) \cdot F_{n-1} + a \cdot M_n\} + \gamma \cdot M_n \quad (3)$$
$$= (1 + \gamma a - \gamma - a) \cdot F_{n-1} + (-\gamma a + \gamma + a)M_n$$
$$= (1-a') \cdot F_{n-1} + a' \cdot M_n$$

wherein $a' = -\gamma a + \gamma + a$ is the adaptive weighting coefficient that depends on the time distance or time interval Δt and the correlation of the values received for the measurement quantity. The adaptive weighting coefficient a' (or equivalently the coefficient γ) is chosen such that the resulting filter characteristic is approximating the conventional filter characteristics when no measurements are missing, i.e. no measurement gaps exist.

Regarding the choice of the coefficient a' or γ, two extreme scenarios can be considered. In the first scenario, the measurement value for the measurement quantity is received within the regular measurement period T, i.e. at the predetermined point in time preceding the current point in time. For this scenario, γ=0 is chosen and the filtering proceeds without any additional correction. In the second scenario, an extremely long measurement gap is present before the receiving of the current measurement value. In this case, γ=1 is chosen and accordingly, the higher layer filtering result does no longer depend on the filter state, it corresponds to the current measurement value. Several possibilities of choosing γ as a function of Δt in between these two extreme scenarios are detailed below.

To obtain a simple approximation of the filtering result in the general case with arbitrary measurement gaps, the coefficient γ can be chosen as a function of the autocorrelation ρ of consecutive measurement values spaced by Δt≥T, with T being the measurement period or regular measurement interval expected by the base station. In particular, the coefficient γ can be expressed as $$\gamma = 1 - \frac{\rho(\Delta t)}{\rho(T)}. \quad (4)$$

ρ(T) denotes the autocorrelation of the measurement quantity for a time shift corresponding to the regular measurement interval T, and ρ(Δt) denotes the autocorrelation of the measurement quantity for a time shift corresponding to the time interval Δt between the receiving of the current measurement value and the receiving of the previous measurement value.

Figure 8:
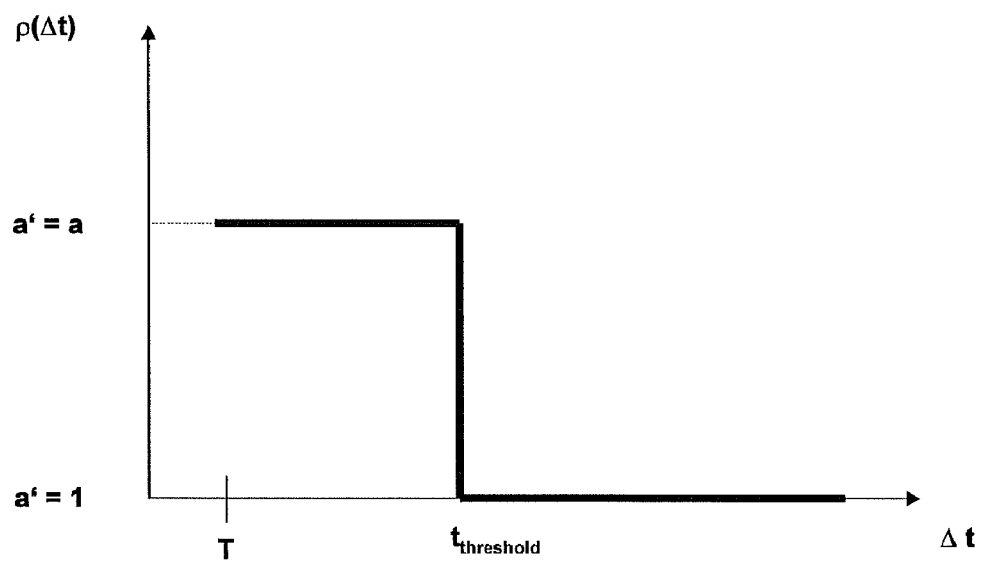
FIG. 8 is a diagram showing an assumed correlation function according to an embodiment of the present invention for adjusting the adaptive weighting coefficient.

According to a first example depicted in FIG. 8, a simple but practical approximation is used for the autocorrelation function ρ(Δt). It is described by a step function which assumes that ρ(Δt)=ρ(T) if Δt is below a threshold time interval $t_{threshold}$, and it assumes that ρ(Δt)=0 for a time interval Δt>$t_{threshold}$. If inserting these approximations in equations (4) and (3), one finds that for the first case (Δt>$t_{threshold}$) the adaptive weighting coefficient a'=a, whereas, in the second case, a'=1. In this example, it is thus assumed that the autocorrelation changes from completely correlated to completely uncorrelated when the time interval Δt increases above $t_{threshold}$.

Figure 4:
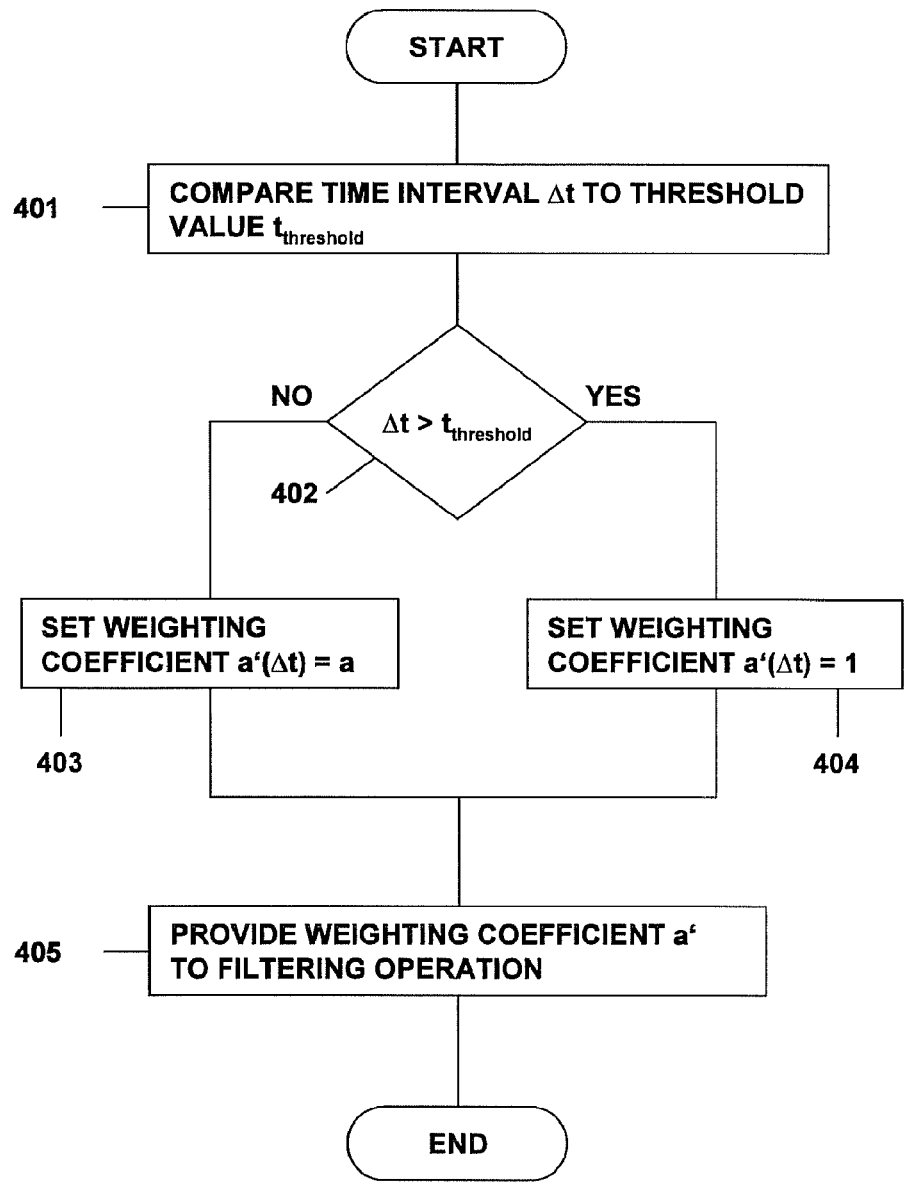
FIG. 4 is a flow diagram illustrating an embodiment of step 305 of FIG. 3 in detail.

The implementation of this example for the determination of a' is depicted in FIG. 4. The time interval Δt determined in step 304 is compared to the threshold value $t_{threshold}$ in step 401. If in decision step 402, it is determined that Δt>$t_{threshold}$, than the adaptive weighting coefficient is set to a'(Δt)=1 (step 404), whereas in the other case the adaptive weighting coefficient is set to a'(Δt)=a (step 403). The determined adaptive weighting coefficient a' is then provided to the filtering operation (step 405).

Figure 9:
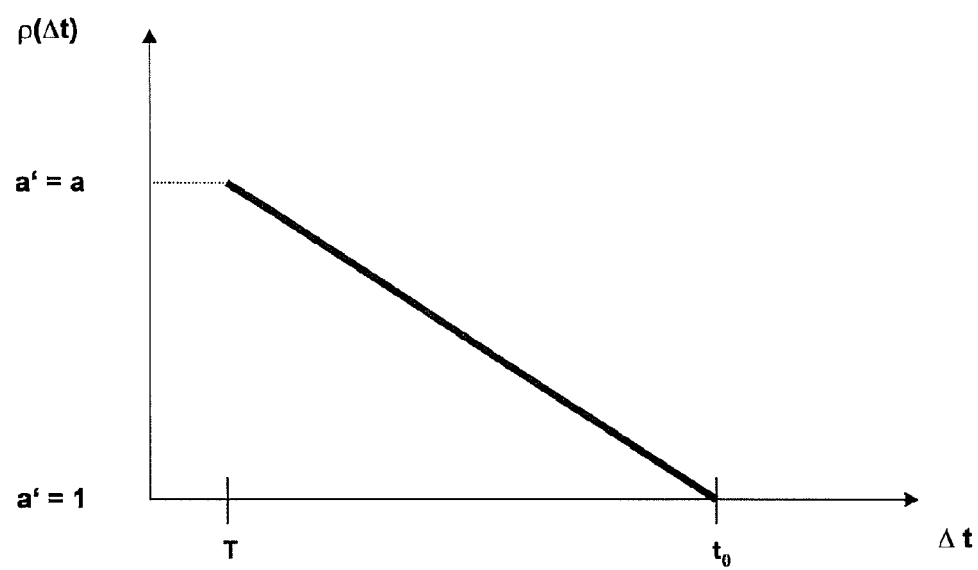
FIG. 9 is a diagram illustrating an assumed correlation function according to another embodiment of the present invention for adjusting the adaptive weighting coefficient.

The second example illustrated in FIG. 9 uses a more refined approximation for the autocorrelation function ρ(Δt). In particular, a linear ramp between the time intervals Δt=T and Δt=$t_0$ is used. With this approximation, it is assumed that for Δt=T, ρ(Δt)=ρ(Δt) resulting in an adaptive weighting coefficient a'=a. Above the threshold time interval Δt≥$t_0$, no autocorrelation, i.e. ρ(Δt)=0, is assumed (again corresponding to a'=1). Between these two values, a decreasing autocorrelation with an increasing Δt is assumed resulting in a corresponding increase in a' and thus a higher weighting of the current measurement value. As a result, if the measurement gap increases, the weighting of past higher layer filtering results is decreased, so that the current filtering result better reflects the current channel conditions of the communication link.

Figure 5:
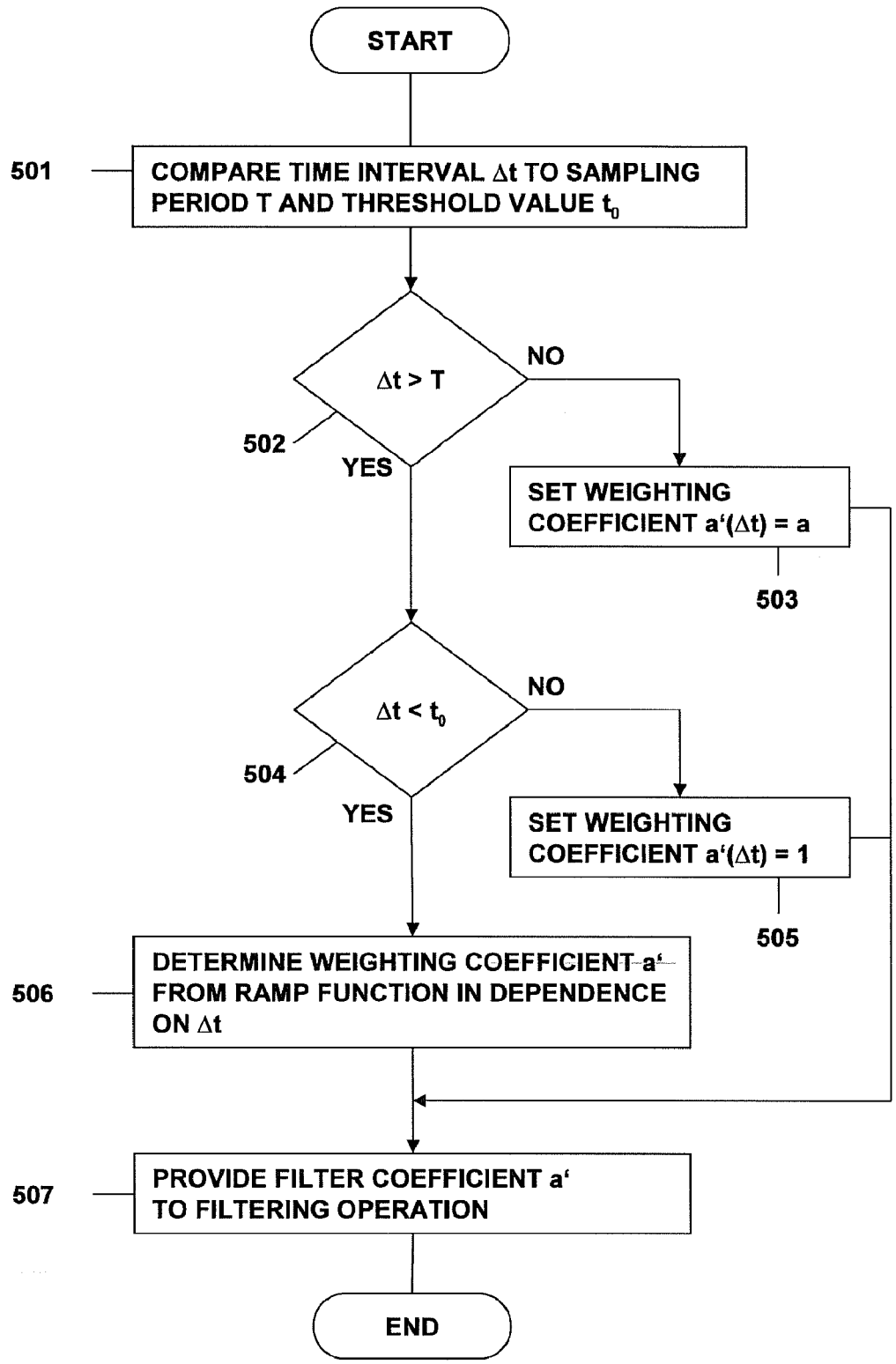
FIG. 5 is a flow diagram illustrating another embodiment of step 305 of FIG. 3 in detail.

An implementation for determining a' in step 305 using such an approximated autocorrelation function is illustrated in FIG. 5. The time interval Δt determined in step 304 is compared to the sampling period or measurement period T and the threshold value $t_0$ (step 501). If Δt is not larger than T (step 502), then the adaptive weighting coefficient is set to a' (Δt)=a (step 503). If Δt>T, then it is checked in step 504 whether Δt is smaller than $t_0$. If not, then the adaptive weighting coefficient is set to a'(Δt)=1 (step 505). If it is smaller, then the value of the adaptive weighting coefficient a' is determined from the ramp function in dependence on Δt in step 506. In step 507, the determined filter coefficient a' is provided to the filtering operation.

In the third example of determining a' described below with respect to FIG. 6, the autocorrelation of the measurement quantity is estimated from the actual measurement process. The measurement value M of the measurement quantity in the logarithmic domain corresponds to a value P in the linear domain. The autocorrelation can be estimated as $$\rho(\Delta t) = E\{M(t + \Delta t) \cdot M(t)\} \quad (5)$$
$$= E\{\log(P(t + \Delta t)) \cdot \log(P(t))\}$$
$$\approx \frac{1}{N} \sum_{t=t_1, t_2, \ldots, t_N} (\log(P(t + \Delta t)) \cdot \log(P(t)))$$

wherein E is the expectation value. As measurement values for the measurement quantity M are received at the predetermined points in time $t=t_1, t_2, \ldots, t_N$, the received values can be stored in the memory and accordingly, the autocorrelation can be calculated for different time intervals (or time shifts/lags) $\Delta t$. It is possible to continually calculate the autocorrelation function $\rho(\Delta t)$ in the background, while receiving measurement values, or it may only be calculated for a particular $\Delta t$, when a measurement gap occurs. For the time lag $\Delta t=T$ and $\Delta t$, the autocorrelation $\rho(T)$ and $\rho(\Delta t)$ can thus be determined and used in equation (4) for the determination of $\gamma$ and subsequently the adaptive weighting coefficient a'. Thus, if there is a certain amount of autocorrelation present even for longer measurement gaps, the preceding measurement values are still taken into account due to the non-zero coefficient a'. In consequence, the filtering result does not only depend on the current measurement value so that the filtering effect is maintained. Even though the method according to the current example requires a higher computational effort, it delivers improved results of the higher layer filtering and accordingly, an improved representation of the conditions on the communication link.

Figure 6:
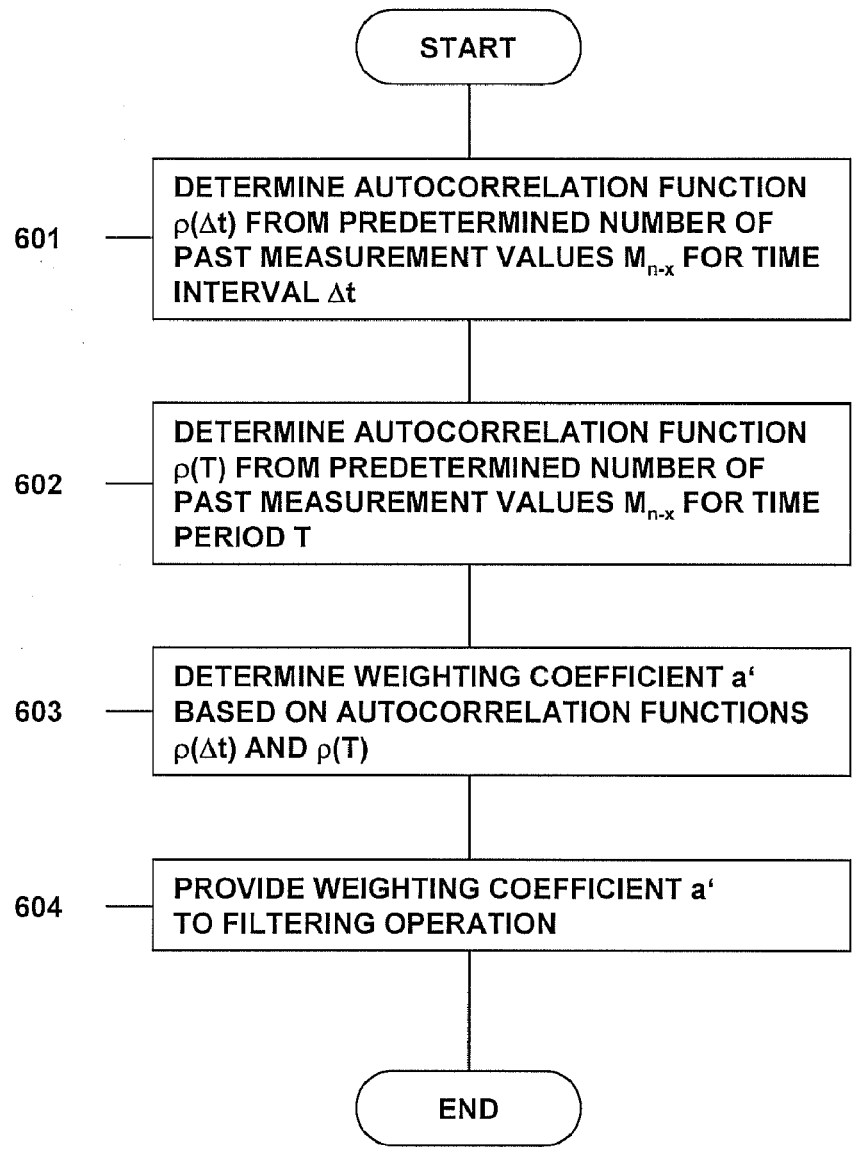
FIG. 6 is a flow diagram illustrating another embodiment of step 305 of FIG. 3 in detail.

An implementation of the current example is illustrated in FIG. 6. For determining a' in step 305, the autocorrelation function $\rho(\Delta t)$ for the time interval $\Delta t$ is determined from measurement values $M_{n-x}$ received in the past (e.g. by making use of equation (5)). In step 602, the autocorrelation function $\rho(T)$ for the measurement period T is similarly determined. Using the autocorrelation determined for $\Delta t$ and T, the weighting coefficient a' is calculated in step 603 (equation (4)). The determined adaptive weighting coefficient a' is then provided to the filtering operation in step 604. It is also possible to introduce further decision steps, such as the decision steps 402, 502 and 404 into the method of FIG. 6, so that for $\Delta t=T$, a' is set to a'=a and for a time interval exceeding a certain threshold interval a' is set to a'=1.

Thus, several possibilities exist for efficiently determining the adaptive weighting coefficient a' as a function of $\Delta t$, i.e. of the size of the measurement gap. It should be clear that the methods described above may not only be performed on a mobile device, but may also be performed by the base station. The base station may thus itself perform the physical layer measurements, the physical layer filtering for obtaining the current measurement value, the determination of the adaptive weighting coefficient as a function of $\Delta t$ and the higher layer filtering of the obtained current measurement value. Physical layer measurements may for example be performed on signals received from the mobile device. Other possibilities are also conceivable, such as the transmission of the measurement values determined for the measurement quantity at the mobile device to the base station, with the higher layer filtering being performed at the base station.

It can further be advantageous to transmit information on the measurement gaps from the mobile device to the base station. The base station can further have information available on how the high layer filtering is performed by the mobile device, i.e. how the adaptive weighting coefficient a' is adjusted as a function of $\Delta t$. The filtering process at the mobile device is then completely transparent to the base station, so that the filtering results for the measurement quantity can be correctly interpreted.

In summary, the present invention provides an improved method of filtering a measurement quantity relating to the communication in a mobile communication network. In particular, measurement reports can be interpreted correctly even in the presence of time varying channel conditions and measurement gaps. A better tracking behaviour of the measurement report is achieved for time varying channel conditions. The new filtering process can retain the simple structure of the higher layer filtering operation, e.g. a one tap infinite impulse response filtering. The timing distance to the previous measurement value (or equivalently the number of measurement values missing) is included in the determination of the adaptive weighting coefficient. As the high layer filtering itself does not require essential modifications, the adapted process can be easily standardized for future UMTS or LTE versions.

The invention claimed is:

1. A method for filtering measurement values of a measurement quantity obtained from a communication between a mobile device and a mobile communication network, wherein a measurement value for the measurement quantity is periodically received at fixed points in time, and wherein the measurement value is filtered using a digital filter for obtaining a filtering result for the measurement quantity, the filtering of the measurement value including the weighting of the measurement value with an adaptive weighting coefficient, the method comprising:
   receiving a current measurement value at a current point in time;
   adjusting the adaptive weighting coefficient, if no measurement value was received for the previous point in time preceding the current point in time, for weighting the current measurement value in dependence on the time interval between the receiving of the current measurement value and a receiving of the last measurement value preceding the current measurement value, thereby adapting the adaptive weighting coefficient if a measurement gap occurs;
   filtering the current measurement value using the adaptive weighting coefficient to obtain the filtering result for the measurement quantity.

2. The method of claim 1 wherein the weighting coefficient is adjusted by setting the weighting coefficient to a value determined as a function of a duration of the time interval, the value increasing for an increasing duration.

3. The method of claim 2 wherein the function is such that the filtering result approaches the current measurement value for an increasing duration.

4. The method of claim 2 wherein the function starts at a first value and gradually increases with an increasing time duration to a second value larger than the first value.

5. The method of claim 1 wherein the weighting coefficient is adjusted by setting the weighting coefficient to a first value if the duration of the time interval is smaller than a predetermined threshold and by setting the weighting coefficient to a second value larger than the first value if the duration exceeds the predetermined threshold.

6. The method of claim 1:
   wherein adjusting the adaptive weighting coefficient comprises setting the weighting coefficient to a value determined as a function of a duration of the time interval, the function comprising an autocorrelation function estimated for the measurement quantity in dependence on the duration;
wherein the function is such that the weighting coefficient value increases with a decreasing autocorrelation of the measurement quantity for the time interval.

7. The method of claim 1 wherein the filtering the current measurement value using the adaptive weighting coefficient comprises determining a weighted average of at least the current measurement value weighted by the adaptive weighting coefficient and a previous filtering result weighted by a second weighting coefficient.

8. The method of claim 1 wherein the measurement quantity is selected from a group comprising:
   a reference signal received power;
   a received signal strength indicator;
   a reference signal received quality;
   a carrier to interference-plus-noise ratio;
   a signal to interference-plus-noise ratio;
   a received signal code power.

9. The method of claim 1 further comprising performing a number of measurements of the measurement quantity and determining the current measurement value by filtering the number of measurements.

10. The method of claim 1 wherein the mobile device automatically performs the receiving, adjusting, and filtering.

11. The method of claim 10 further comprising the mobile device transmitting the filtering result to a base station of the mobile communication network.

12. The method of claim 1 wherein a base station of the mobile communication network is in communication with the mobile device, and wherein the base station automatically performs the receiving, adjusting, and filtering.

13. The method of claim 12 further comprising the base station receiving information from the mobile device relating to the points in time at which the mobile device was or was not capable of obtaining a measurement value for the measurement quantity.

14. A mobile communication network device configured to filter measurement values of a measurement quantity obtained from a communication between the mobile communication network device and a second mobile communication network device, comprising:
   a digital filter circuit configured to:
      periodically receive a measurement value for the measurement quantity at fixed points in time;
      obtain a filtering result for the measurement quantity by filtering the measurement value, the filtering of the measurement value comprising weighting the measurement value with an adaptive weighting coefficient;
   a filter adjustment circuit configured to:
      adjust the adaptive weighting coefficient, if no measurement value was received for a previous point in time preceding a current point in time, for weighting a current measurement value received by the digital filter circuit at the current point in time in dependence on a duration of a time interval between receiving of the current measurement value and receiving of a last measurement value preceding the current measurement value, thereby adapting the adaptive weighting coefficient if a measurement gap occurs.

15. The mobile communication network device of claim 14 wherein the filter adjustment circuit is adapted to adjust the weighting coefficient by setting the weighting coefficient to a value determined as a function of the duration, the value increasing for an increasing duration.

16. The mobile communication network device of claim 14 further comprising:
   an autocorrelation determination circuit configured to estimate an autocorrelation function for the measurement quantity in dependence on the duration;
   wherein the filter adjustment circuit is configured to adjust the weighting coefficient by setting the weighting coefficient to a value determined as a function of the autocorrelation function, the function being such that the value increases with a decreasing autocorrelation of the measurement quantity for the time interval.

17. The mobile communication network device of claim 14 further comprising:
   memory adapted to store at least one filtering result;
   wherein the digital filter circuit is adapted to perform the filtering by determining a weighted average of at least:
      the current measurement value weighted by the adaptive weighting coefficient; and
      a previous filtering result retrieved from the memory and weighted by a second weighting coefficient.

18. The mobile communication network device of claim 14 further comprising:
   a measurement circuit configured to perform a number of measurements of the measurement quantity;
   a filtering circuit configured to filter the number of measurements for providing the current measurement value.

19. The mobile communication network device of claim 14:
   wherein the mobile communication network device is a mobile device;
   wherein the second mobile communication network device is a base station of a mobile communication network.

20. The mobile communication network device of claim 14:
   wherein the mobile communication network device is a base station of a mobile communication network;
   wherein the second mobile communication network device is a mobile device.

* * * * *

UNITED STATES PATENT AND TRADEMARK OFFICE
CERTIFICATE OF CORRECTION

PATENT NO. : 8,824,973 B2
APPLICATION NO. : 13/513710
DATED : September 2, 2014
INVENTOR(S) : Kleinhenz et al.

Page 1 of 1

It is certified that error appears in the above-identified patent and that said Letters Patent is hereby corrected as shown below:

In The Specification

In Column 6, Line 37, insert Heading -- DETAILED DESCRIPTION --.

In Column 6, Line 60, delete "too" and insert -- 100 --, therefor.

In Column 6, Line 61, delete "too" and insert -- 100 --, therefor.

In Column 7, Line 5, delete "too" and insert -- 100 --, therefor.

In Column 7, Line 18, delete "too" and insert -- 100 --, therefor.

Signed and Sealed this
Sixteenth Day of August, 2016

Michelle K. Lee
*Director of the United States Patent and Trademark Office*